United States Patent [19]

Ikeda et al.

[11] Patent Number: 5,092,182
[45] Date of Patent: Mar. 3, 1992

[54] STRAIN DETECTOR

[75] Inventors: Hideo Ikeda; Chiyo Hamamura; Hiroshi Satoh; Yoshihiko Utsui, all of Hyogo, Japan

[73] Assignee: Mitsubishi Denki Kabushiki Kaisha, Tokyo, Japan

[21] Appl. No.: 695,007

[22] Filed: May 3, 1991

Related U.S. Application Data

[62] Division of Ser. No. 509,798, Apr. 17, 1990, Pat. No. 5,036,713.

[30] Foreign Application Priority Data

Apr. 22, 1989 [JP] Japan .................... 1-102821
Apr. 27, 1989 [JP] Japan .................... 1-109714

[51] Int. Cl.⁵ .......................... G01L 3/10; G01B 7/24
[52] U.S. Cl. .................... 73/862.36; 73/779; 324/209
[58] Field of Search ............... 73/862.36, 779, 862.69, 73/DIG. 2; 324/209

[56] References Cited

U.S. PATENT DOCUMENTS 3,861,206  1/1975  Kawafune et al.
4,414,855  11/1983 Iwasaki .
4,976,160  12/1990 Dobler et al. .................... 73/862.36

FOREIGN PATENT DOCUMENTS 0044839  3/1985  Japan .................... 73/862.36
0260821  12/1985 Japan .................... 73/862.36
0298735  12/1987 Japan .................... 73/862.36

OTHER PUBLICATIONS

I. Sasada et al., "Torque Transducers with Stress-Sensitive Amorphous Ribbons of Chevron-Pattern", *IEEE Transactions on Magnetics*, vol. MAG-20, No. 5, Sep. 1984.

*Primary Examiner*—Charles A. Ruehl
*Attorney, Agent, or Firm*—Burns, Doane, Swecker & Mathis

[57] ABSTRACT

A strain detector wherein the efficiency of a detecting coil is improved to improve the sensitivity of the strain detector. The strain detector comprises a magnetic layer made of a soft magnetic material having a high permeability and fixedly mounted on an outer periphery of a driven shaft strain of which is to be detected, and a detecting coil disposed around the magnetic layer with a gap left therebetween for detecting a variation of the permeability arising from strain of the magnetic layer caused by an external force applied to the driven shaft. The strain detector further comprises a metal layer made of a non-magnetic material having a high electric conductivity and disposed in the gap between the magnetic layer and the detecting coil. Or else, the detecting coil has a pair of coil portions connected to each other by way of an intermediate portion thereof, and an electric current flows in the same direction through the coil portions.

1 Claim, 5 Drawing Sheets

STRAIN DETECTOR

This application is a divisional of application Ser. No. 07/509,798, filed Apr. 17, 1990, now U.S. Pat. No. 5,036,713.

BACKGROUND OF THE INVENTION

1. Field of the Invention

This invention relates to a strain detector for detecting strain of a driven shaft such as, for example, a rotary shaft.

2. Description of the Prior Art

An exemplary one of conventional strain detectors is shown in FIG. 7. Referring to FIG. 7, a driven shaft 1 in the form of a rotary shaft which is an object for the detection of strain is supported for rotation around a center axis 2 by means of a pair of bearings 3 and 4. First and second elongated magnetic layers 5 and 6 made of a soft magnetic material having a high permeability and suitable magnetostriction are fixedly mounted on an outer periphery of the driven shaft 1 in a spaced relationship from each other in an axial direction of the driven shaft 1. Each of the magnetic layers 5 and 6 is composed of a plurality of parallel layer stripes, and the stripes of the first magnetic layers 5 extend at an angle of +45 degrees with respect to the center axis 2 while the stripes of the second magnetic layers 6 extend at another angle of −45 degrees with respect to the center axis 2. A cylindrical coil bobbin 7 is disposed around the magnetic layers 5 and 6 in a concentrical relationship to the driven shaft 1. First and second detecting coils 8 and 9 in the form of solenoids are wound on the coil bobbin 7 corresponding to the magnetic layers 5 and 6, respectively. The detecting coils 8 and 9 are connected to a detecting circuit 14. A pair of magnetic converging layers 10 and 11 made of a soft magnetic material having a high permeability and suitable magnetostriction are disposed around the detecting coils 8 and 9, respectively.

With the strain detector of the construction described above, if an external force is applied to the driven shaft 1, then a tensile force is produced on either one of the magnetic layers 5 and 6 while a compression force is produced on the other of the magnetic layers 5 and 6. The magnetostriction of the magnetic layers 5 and 6 allows the orientation of the magnetization within each domain to be altered by the stress associated with applied torque, then the permeability of the magnetic layers 5 and 6 is varied. In this instance, the permeability is varied in the opposite direction whether the strain is caused by a tensile force or a compression force. Each of the detecting coils 8 and 9 detects a variation in permeability as a variation in magnetic impedance, and the detecting circuit 14 detects and amplifies a difference between outputs of the detecting coils 8 and 9 and develops a detection voltage V corresponding to an amount of strain of the driven shaft 1. Each of the magnetic converging layers 10 and 11 converges magnetic fluxes on the outer periphery side of the detecting coil 8 or 9 to reduce the reluctance of the magnetic circuit to improve the sensitivity of the strain detector.

FIGS. 8a and 8b show a magnetic circuit and an electric equivalent circuit of the conventional strain detector described above. Referring to FIGS. 7, 8a and 8b, magnetic fluxes generated upon energization of each of the detecting coils 8 and 9 include magnetic fluxes Fg and F'g which pass through a gap between the detecting coil 8 or 9 and the magnetic layer 5 or 6, magnetic fluxes Feff which pass through the magnetic layer 5 or 6, and magnetic fluxes Fs which pass through the driven shaft 1. Since the magnetic converging layers 10 and 11 have a high permeability, the magnetic fluxes Fg, Feff and Fs all path through the magnetic converging layer 10 or 11 on the outer periphery of the detecting coil 8 or 9. Meanwhile, electric currents Ig, Ieff and Is are obtained by conversion of the magnetic fluxes Fg and F'g, Feff, and Fs, respectively, while a voltage E corresponds to a magnetomotive force of the detecting coil 8 or 9. Further, resisters Rg, Reff and Rs correspond to reluctances of the gap, the magnetic layer 5 or 6, and the driven shaft 1, respectively, while a resistor Rex corresponds to a reluctance on the outer periphery side of the detecting coil 8 or 9. In addition, a reluctance Ry of the magnetic converging layer 10 or 11 is inserted in parallel to the resistor Rex. Thus, since the reluctance Ry has a comparatively low value, the total electric current I is high and the magnetic fluxes Feff are also high, and consequently, the sensitivity is high.

With the conventional strain detector described above, however, the magnetic fluxes Fg, F'g and Fs which do not pass through the magnetic layer 5 or 6 and accordingly do not contribute to detection of strain are involved at a comparatively high ratio. Consequently, the conventional strain detector has a problem that a sufficiently high strain detecting sensitivity cannot be attained.

Besides, with the conventional strain detector described above, while magnetic fluxes generated by each of the detecting coils 8 and 9 pass through the magnetic converging layer 10 or 11 and then through the magnetic layer 5 or 6 to make loops, the distribution of the magnetic fluxes is uneven such that the intensity of the magnetic field at an end portion of the detecting coil 8 or 9 is about one half the intensity of the magnetic field at a central portion of the detecting coil 8 or 9 as seen in FIGS. 9a and 9b, that is, $He \approx (\frac{1}{2}) \cdot Ho$, where Ho is an intensity of a magnetic field at a central portion of the length l of the detecting coil 8 or 9, and He is an intensity of a magnetic field at an end portion of the coil 8 or 9. Accordingly, while the magnetic flux density of the magnetic layer 5 or 6 is comparatively high at a central portion of the detecting coil 8 or 9 in the lengthwise direction, part of the magnetic fluxes pass a spacing between the detecting coil 8 or 9 and the magnetic layer 5 or 6 as seen in FIG. 9b. Consequently, the energization efficiency of the detecting coils 8 and 9 are deteriorated and the sensitivity of the strain detector is deteriorated.

SUMMARY OF THE INVENTION

It is an object of the present invention to provide a strain detector wherein the efficiency of a detecting coil is improved to improve the sensitivity of the strain detector.

In order to attain the object, according an aspect of the present invention, there is provided a strain detector for detecting strain of a driven shaft to which an external force is applied, which comprises a magnetic layer made of a soft magnetic material having a high permeability and suitable magnetostriction and fixedly mounted on an outer periphery of the driven shaft, a detecting coil disposed around the magnetic layer with a gap left therebetween for detecting a variation of the permeability arising from strain of the magnetic layer caused by an external force applied to the driven shaft, and a metal layer made of a non-magnetic material having a high electric conductivity and disposed in the gap between the magnetic layer and the detecting coil. Preferably, the metal layer has an axial length smaller than the axial length of the detecting coil.

With the strain detector, since the metal layer is made of a non-magnetic material having a high electric conductivity, those of magnetic fluxes generated by the detecting coil which tend to flow through the gap between the magnetic layer and the detecting coil are prevented from flowing the gap due to a skin effect of the metal layer and consequently flow through the magnetic layer. Accordingly, the strain detecting sensitivity of the strain detector is improved. Where the metal layer has a smaller axial length than the detecting coil, also those magnetic fluxes which tend to flow in a short circuit through the gap are prevented effectively from flowing in such short circuit by the metal layer and consequently flow through the magnetic layer. Accordingly, the strain detecting sensitivity of the strain detector is further improved.

According to another aspect of the present invention, there is provided a strain detector for detecting strain of a driven shaft to which an external force is applied, which comprises a magnetic layer made of a soft magnetic material having a high permeability and suitable magnetostriction and fixedly mounted on an outer periphery of the driven shaft, and a detecting coil disposed around the magnetic layer for detecting a variation of the permeability arising from strain of the magnetic layer caused by an external force applied to the driven shaft, the detecting coil having a pair of coil portions connected to each other by way of an intermediate portion thereof, the coil portions of the detecting coil being disposed such that an electric current may flow in the same direction therethrough. The coil portions of the detecting coil may be wound thickly while the intermediate portion which interconnect the coil portions is wound thinly.

With the strain detector, magnetic fluxes generated by the detecting coil present a substantially uniform distribution over the entire length of the detecting coil, and almost all of the magnetic fluxes flow through the magnetic layer. Consequently, the magnetic flux generating efficiency and hence the strain detecting sensitivity of the detecting coil and hence of the strain detector are improved.

The above and other objects, features and advantages of the present invention will become apparent from the following description and the appended claims, taken in conjunction with the accompanying drawings in which like parts are denoted by like reference characters all through the drawings.

DESCRIPTION OF THE PREFERRED EMBODIMENTS

Figure 1:
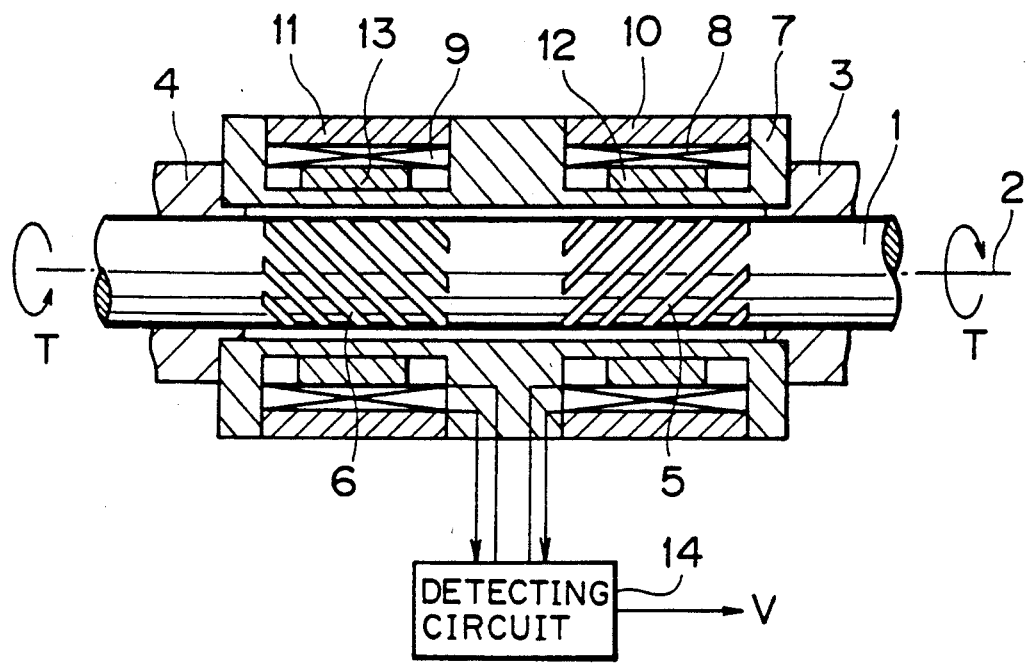
FIG. 1 is a schematic sectional view of a strain detector showing a first preferred embodiment of the present invention.

Referring first to FIG. 1, there is shown a strain detector according to a first preferred embodiment of the present invention. The strain detector shown is provided to detect strain of a driven shaft 1 in the form of a rotary shaft supported for rotation around a center axis 2 by means of a pair of bearings 3 and 4. The strain detector includes first and second elongated magnetic layers 5 and 6 made of a soft magnetic material having a high permeability and suitable magnetostriction and fixedly mounted on an outer periphery of the driven shaft 1 in a spaced relationship from each other in an axial direction of the driven shaft 1. Each of the magnetic layers 5 and 6 is composed of a plurality of parallel layer stripes, and the strips of the first magnetic layer 5 extend at an angle of +45 degrees with respect to the center axis 2 while the stripes of the second magnetic layer 6 extend at another angle of −45 degrees with respect to the center axis 2. A cylindrical coil bobbin 7 is disposed around the magnetic layers 5 and 6 in a concentrical relationship around the driven shaft 1. First and second detecting coils 8 and 9 in the form of cylindrical solenoids are wound on the coil bobbin 7 corresponding to the magnetic layers 5 and 6, respectively. The detecting coils 8 and 9 are connected to a detecting circuit 14. A pair of magnetic converging layers 10 and 11 made of a soft magnetic material having a high permeability are disposed around the detecting coils 8 and 9, respectively. Meanwhile, first and second cylindrical metal layers 12 and 13 made of a non-magnetic material of a high electric conductivity such as copper or aluminum are provided in an opposing relationship to the magnetic layers 5 and 6 on inner peripheries of the detecting coils 8 and 9 on the coil bobbin 7, respectively. The cylindrical metal layers 12 and 13 have an axial length smaller than the axial length of the cylindrical detecting coils 8 and 9 and are located at axial central positions with respect to the detecting coils 8 and 9, respectively, as seen in FIG. 1.

Figure 2A:
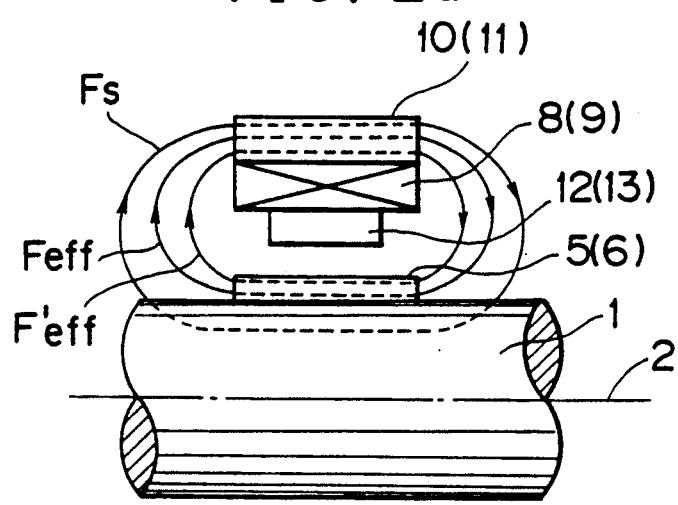
FIGS. 2a and 2b are circuit diagrams of a magnetic circuit and an electric equivalent circuit of the strain detector shown in FIG. 1.
Figure 2B:
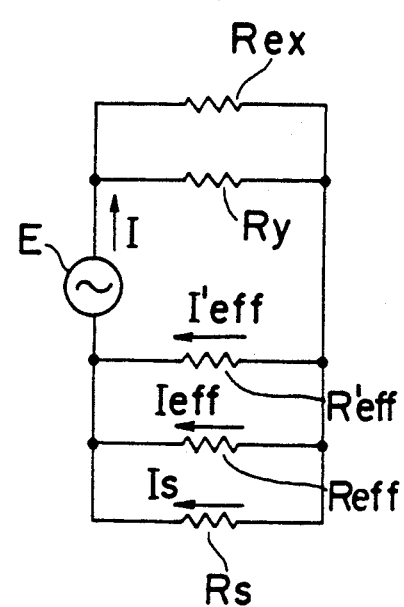
Figure 7:
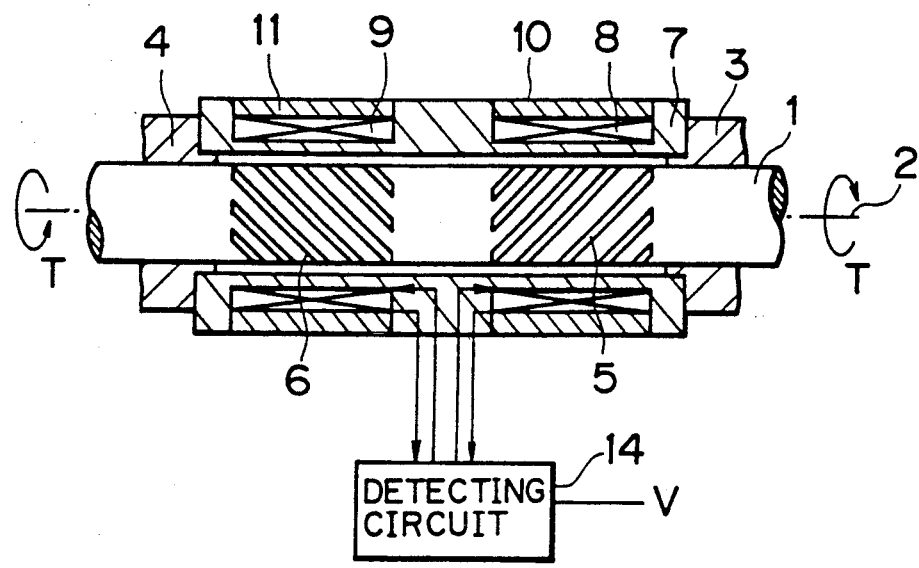
FIG. 7 is a schematic sectional view showing a conventional strain detector.
Figure 8A:
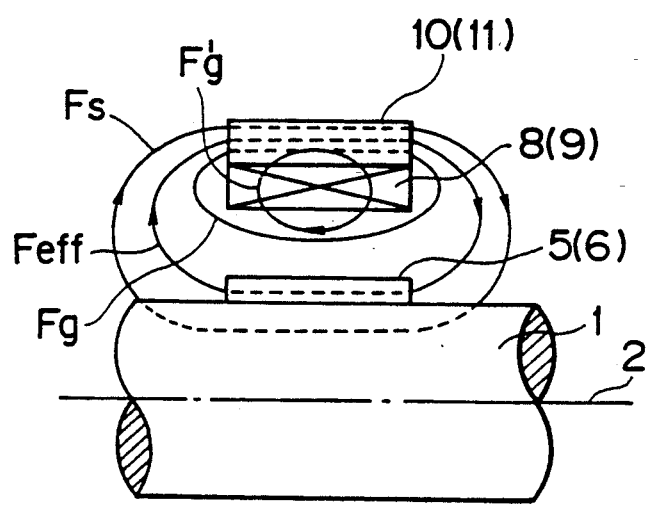
FIGS. 8a and 8b are circuit diagrams of a magnetic circuit and an electric equivalent circuit of the strain detector shown in FIG. 7.
Figure 8B:
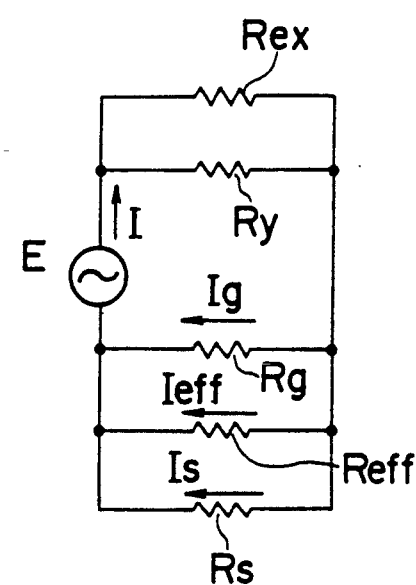
Figure 9A:
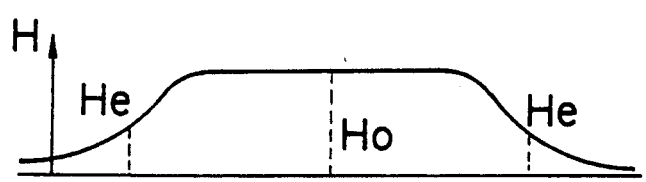
FIGS. 9a and 9b are a graph and a diagrammatic view illustrating a magnetic flux distribution and flows of magnetic fluxes of the detecting coil shown in FIG. 7.
Figure 9B:
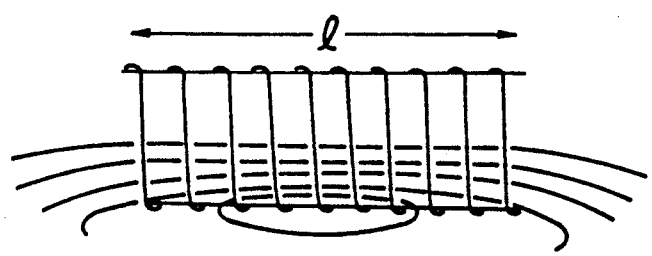

Referring now to FIGS. 2a and 2b, there are shown a magnetic circuit and an electric equivalent circuit of the strain detector shown in FIG. 1. Since the metal layers 12 and 13 are made of a non-magnetic material having a high electric conductivity, the depth of penetration of alternating magnetic fluxes is very small due to a skin effect thereof. Accordingly, of magnetic fluxes generated by the detecting coil 8 or 9, magnetic fluxes Fg and F'g, which pass, in the case of the conventional strain detector shown in FIG. 7, through the gap between the detecting coil 8 or 9 and the magnetic layer 5 or 6 as shown in FIG. 8a, here as magnetic fluxes F'eff through the magnetic layer 5 or 6 due to the presence of the magnetic layer 12 or 13. Consequently, the sensitivity of the detecting coils 8 and 9 and hence of the entire strain detector is improved. Particularly since the metal layers 12 and 13 have a smaller axial length than the detecting coils 8 and 9, each of them is effective for the magnetic fluxes F'g which may otherwise flow in small closed loops to flow in such large closed loops that pass as the magnetic fluxes F'eff through the magnetic layer 5 or 6.

Figure 3A:
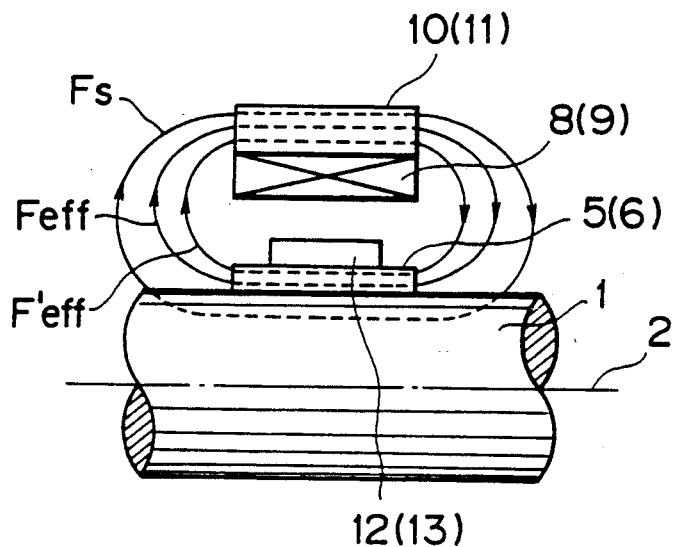
FIGS. 3a and 3b are circuit diagrams of a magnetic circuit and an electric equivalent circuit of a modified strain detector to that shown in FIG. 1.
Figure 3B:
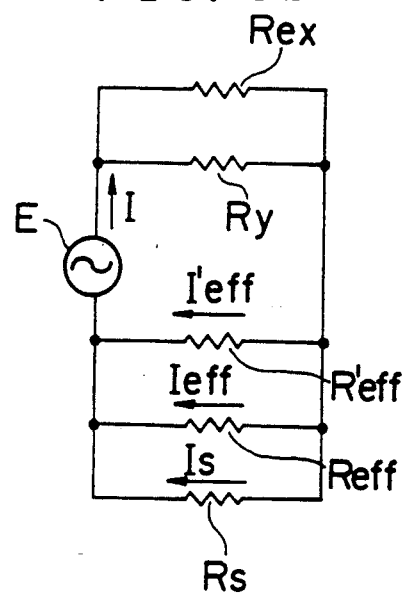

FIG. 3a is a view similar to FIG. 2a but illustratively shows a modification to the strain detector shown in FIG. 1, and FIG. 3b shows an electric equivalent circuit of the modified strain detector. Referring to FIGS. 3a and 3b, the modified strain detector is different from the strain detector shown in FIG. 1 only in that the metal layers 12 and 13 are disposed on outer peripheries of the magnetic layers 5 and 6, respectively. Also with the modified strain detector, such magnetic fluxes Fg and F'g as described above pass as magnetic fluxes F'eff through the magnetic layer 5 or 6 due to a skin effect of the metal layer 12 or 13. Consequently, the modified strain detector has a high sensibility.

Figure 4:
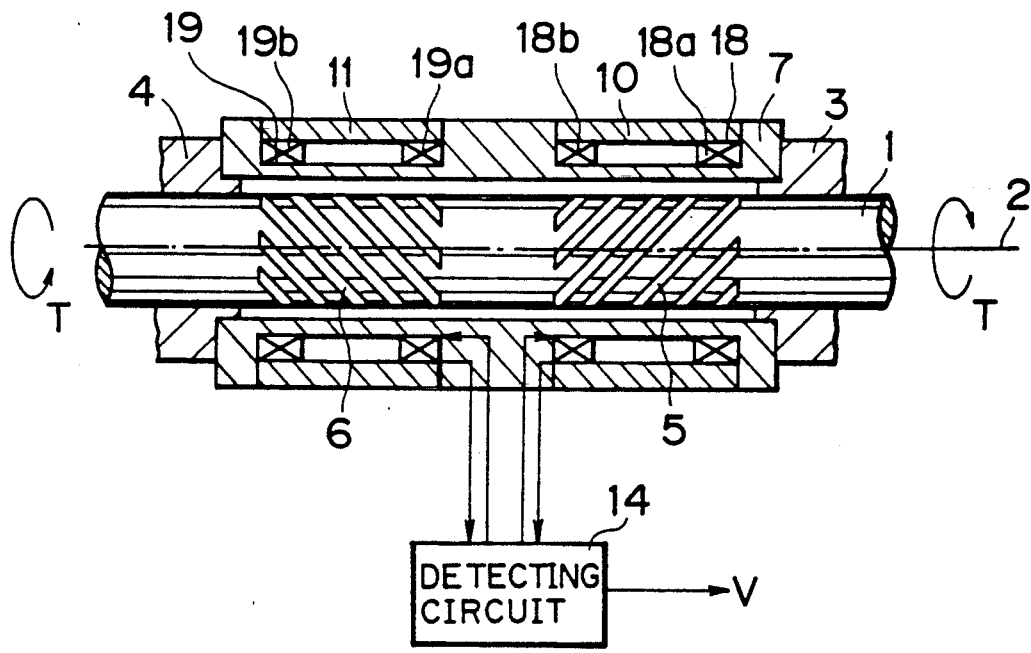
FIG. 4 is a schematic sectional view of a strain detector showing a second preferred embodiment of the present invention.
Figure 6A:
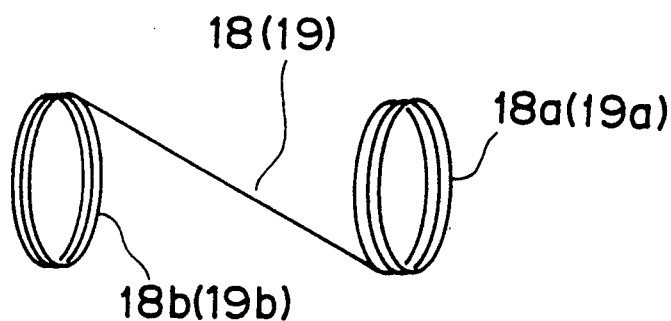
FIGS. 6a and 6b are schematic perspective views showing exemplary forms of the detecting coil of the strain detector shown in FIG. 4.

Referring now to FIG. 4, there is shown a strain detector according to a second embodiment of the present invention. The strain detector has a generally similar construction to that of the strain detector shown in FIG. 1 but is different in that it does not include such metal layers as the metal layers 12 and 13 but includes a pair of detecting coils 18 and 19 of a modified construction. In particular, referring to FIG. 6a, each of the detecting coils 18 and 19 wound on the coil bobbin 7 corresponding to the magnetic layers 5 and 6 of the split type, respectively, includes a pair of coil portions 18a and 18b or 19a and 19b connected to each other by way of a wire or line of the coil 18 or 19 and disposed in a concentric relationship around the center axis 2 of the driven shaft 1. The coil portions 18a, 18b and 19a, 19b of the coils 18 and 19 are supplied with electric currents which flow in the same direction.

Figure 5:
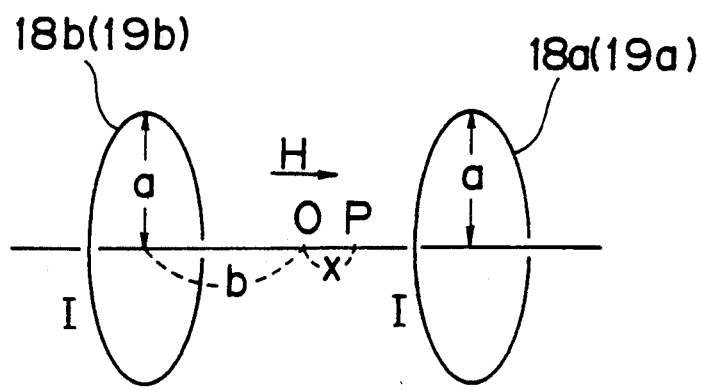
FIG. 5 is a diagrammatic representation illustrating a magnetic field generated by a detecting coil of the strain detector shown in FIG. 4.

Referring to FIG. 5, where the radius of the coil portions 18a, 18b and 19a, 19b of the detecting coils 18 and 19 of the strain detector of the construction described above is represented by a, the distance between the coil portions 18a and 18b and between the coil portions 19a and 19b is represented by 2b, the central point between the coil portions 18a and 18b or 19a and 19b is represented by O, and the coil current is represented by I, and where $a \approx 2b$ stands, the intensity H of the magnetic field at a point P spaced by a distance x from the point O on the center axis 2 is given by the following expression:

$$H = \frac{a^2 I}{2} \left[ \frac{1}{\{a^2 + (b+x)^2\}^{3/2}} + \frac{1}{\{a^2 + (b-x)^2\}^{3/2}} \right]$$

Accordingly, the intensity Ho of the magnetic field at the central point O is given, by substituting x=0 into the equation above, by the following expression:

$$Ho = \frac{a^2 I}{(a^2 + b^2)^{3/2}}$$

Meanwhile, the intensity He of the magnetic field at the position of each of the coil portions 1a, 18b, 19a and 19b is given, by substituting x=b, by the following expression:

$$He = \frac{a^2 I}{2} \left( \frac{1}{(a^2 + 4b^2)^{3/2}} + \frac{1}{a^3} \right)$$

Since $a \approx 2b$ here, the following expression is obtained:

$He/Ho = 0.95$

Accordingly, the intensity of the magnetic field presents little variation at a central portion and an end portion of each of the detecting coils 18 and 19 and thus provides a uniform magnetic flux distribution. Consequently, very small amount of magnetic fluxes pass through the spacing between each of the detecting coils 18 and 19 and the magnetic layer 5 or 6 at a central portion of the detecting coil 18 or 19 while almost all fluxes pass through the magnetic layer 5 or 6. Accordingly, the efficiency and hence the sensitivity of the detecting coils 18 and 19 and hence of the strain detector are improved. It is to be noted that similar effects can be attained even if the condition of $a \approx 2b$ is not necessarily satisfied.

Figure 6B:
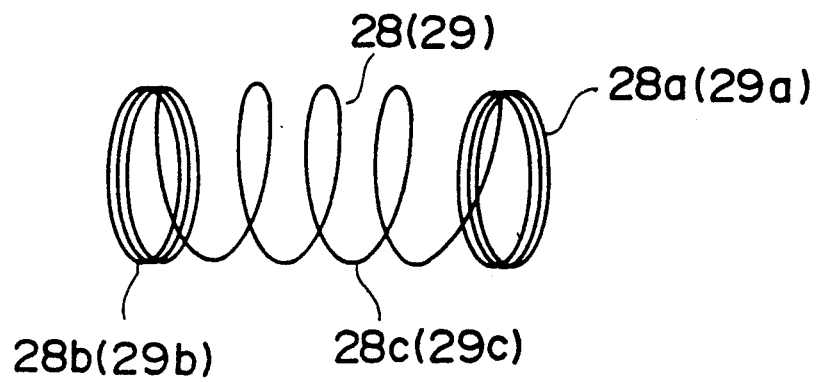

FIG. 6b shows an alternative construction of the detecting coils 18 and 19. The alternative detecting coil 28 (or 29) has a pair of thickly wound coil portions 28a and 28b (29a and 29b) at the opposite ends thereof and a thinly wound coil portion 28c (29c) at an intermediate portion between the thickly wound coil portions 28a and 28b (29a and 29b). Also with the detecting coil 28 (29), a uniform magnetic field is obtained, and similar effects to those described above can be attained.

Having now fully described the invention, it will be apparent to one of ordinary skill in the art that many changes and modifications can be made thereto without departing from the spirit and scope of the invention as set forth herein.

What is claimed is:

1. A strain detector for detecting strain of a driven shaft to which an external force is applied, comprising a magnetic layer made of a soft magnetic material having a high permeability and fixedly mounted on an outer periphery of said driven shaft, and a detecting coil disposed around said magnetic layer for detecting a variation of the permeability arising from strain of said magnetic layer caused by an external force applied to said driven shaft, said detecting coil having a pair of coil portions connected to each other by way of an intermediate portion thereof, said coil portions of said detecting coil being disposed such that an electric current may flow in the same direction therethrough, wherein said coil portions of said detecting coil are wound thickly while said intermediate portion which interconnect said coil portions is wound thinly.

* * * * *